United States Patent
Kornfeld et al.

(10) Patent No.: US 6,523,338 B1
(45) Date of Patent: Feb. 25, 2003

(54) PLASMA ACCELERATOR ARRANGEMENT

(75) Inventors: Günter Kornfeld, Elchingen (DE); Jürgen Wegener, Ulm (DE); Harald Seidel, Burgrieden (DE)

(73) Assignee: Thales Electron Devices GmbH, Ulm (DE)

(*) Notice: Subject to any disclaimer, the term of this patent is extended or adjusted under 35 U.S.C. 154(b) by 0 days.

(21) Appl. No.: 09/720,208

(22) PCT Filed: Jun. 11, 1999

(86) PCT No.: PCT/DE99/01708

§ 371 (c)(1),
(2), (4) Date: Dec. 22, 2000

(87) PCT Pub. No.: WO00/01206

PCT Pub. Date: Jan. 6, 2000

(30) Foreign Application Priority Data

Jun. 26, 1998 (DE) .......................................... 198 28 704

(51) Int. Cl.[7] ................................................. H05H 1/54
(52) U.S. Cl. .................. 60/202; 60/203.1; 313/111.61; 313/111.81; 315/362.1; 315/154; 315/231.31
(58) Field of Search ................................ 60/202, 203.1; 315/111.61, 111.41, 111.81; 313/359.1, 362.1, 154, 231.31

(56) References Cited

U.S. PATENT DOCUMENTS

| | | | | |
|---|---|---|---|---|
| 2,847,607 A | * | 8/1958 | Pierce | 313/154 |
| 3,183,398 A | * | 5/1965 | Hergenrother | 313/154 |
| 3,505,550 A | * | 4/1970 | Levoy et al. | 310/11 |
| 3,719,893 A | * | 3/1973 | dePackh | 313/359.1 |
| 4,293,794 A | * | 10/1981 | Kapetanakos | 315/111.81 |
| 5,539,274 A | * | 7/1996 | Araki et al. | 313/231.31 |

FOREIGN PATENT DOCUMENTS

| | | |
|---|---|---|
| DE | 12 22 589 | 8/1966 |
| JP | 04 242046 | 8/1992 |
| JP | 09 223474 | 8/1997 |

* cited by examiner

*Primary Examiner*—Ted Kim
(74) *Attorney, Agent, or Firm*—Collard & Roe, P.C.

(57) ABSTRACT

For a plasma accelerator arrangement in particular for use as an ion thruster in a spacecraft, a structure is proposed in connection with which an accelerated electron beam is admitted into an ionization chamber with fuel gas, and is guided through the ionization chamber in the form of a focused beam against an electric deceleration field, said electric deceleration field acting at the same time as an acceleration field for the fuel ions produced by ionization. The arrangement generates a focused beam of a largely neutral plasma with a high degree of efficiency. Configurations for electric and magnetic fields for guiding and focusing the beams are given by way of example.

20 Claims, 3 Drawing Sheets

PLASMA ACCELERATOR ARRANGEMENT

CROSS REFERENCE TO RELATED APPLICATIONS

Applicants claim priority under 35 U.S.C. §119 of GERMAN Application No. 198 28 704.6 filed on Jun. 26, 1998. Applicants also claim priority under 35 U.S.C. §120 of PCT/DE99/01708 filed on Jun. 11, 1999. The international application under PCT article 21 (2) was not published in English.

DESCRIPTION

The invention relates to a plasma accelerator arrangement. Plasma accelerators (ion thrusters, electric propulsion systems—EPS) are very important as thrusters in spacecraft both for satellites orbiting close to the earth and geostationary satellites, and for space missions outside of the earth orbit. The ratio of driving pulse to mass of the fuel, which is used as a measure of the degree of efficiency of the drive system is substantially more favorable for plasma accelerators than for conventional chemical drive system, with the result that the proportional weight of the fuel is reduced. Such a reduction is of particular importance for space applications. A noble gas with a high atomic weight, in particular xenon is frequently employed as the fuel.

In conjunction with grid ion thrusters, for example U.S. Pat. No. 4,838,021, a plasma is produced in an ionization chamber from neutral gas by high frequency or electron bombardment. The positively charged ions are accelerated in an applied electrical field in the direction of ejection toward a grid electrode. For the electrical neutralization, a current of free electrons has to be added to the accelerated ion current. The neutralized current of plasma exits from the drive system at high speed and accelerates the spacecraft in the opposite direction. Owing to the space charging effects, the density of the ion current is limited, and the drive systems of this type require large cross sections combined with only moderate reaction propulsion effects.

In conjunction with drive systems according to the Hall principle, for example EP 541,309 A1, a ring-shaped ionization chamber is penetrated by an electrical acceleration field parallel with the axis of the ring, and a radial magnetic field. From an external electron source, electrons are guided into the ionization chamber containing neutral xenon gas against the direction of ejection of the ions. In said ionization chamber, the electrons are forcibly guided into spiral orbits because of the magnetic field, and the running distance within the ionization chamber is multiplied in this way versus the direct distance to the anode, with ionizing interaction with the fuel gas being increased in this way as well. Secondary electrodes are affected by the magnetic deflection as well and are accelerated in the electrical field. Furthermore, the given field configuration largely prevents the development of space charging zones that might cause screening of the electrical acceleration field for the positive fuel ions. The acceleration of the positive ions therefore takes place in a largely neutral plasma. Such an arrangement permits distinctly higher current densities than a grid ion drive system arrangement; however, it exhibits an only moderate degree of efficiency due to large widening of the angle of the ejected ion current.

DE 1,222,589 B describes a device for generating a space charge-neutralized beam of charged particles in connection with which a beam of highly accelerated electrons is admitted into an ionization chamber along its longitudinal axis and guided by a magnetic field extending parallel with the longitudinal axis. An arc discharge in the ionization chamber generates from admitted gas slow electrons and positively charged ions. While the latter are accelerated in the direction of the primary electron beam by an ion acceleration electrode and exit from the ionization chamber together with decelerated electrons of the primary electron beam in the form of a neutral plasma beam, the slow electrons of the gas discharge oscillate between the electrodes on the inlet and outside sides, guided by the magnetic field extending parallel with the longitudinal axis. The accelerated ions and the decelerated electrons of the electron beam exit from the arrangement as a neutral plasma beam.

The present invention is based on the problem of proposing a plasma accelerator arrangement in particular in the form of an ion thruster in spacecraft, with an enhanced degree of efficiency.

The invention is described in patent claim 1. The dependent claims contain advantageous embodiments and further developments of the invention.

In conjunction with the arrangement as defined by the invention, the focused electron beam introduced into the ionization chamber first initiates ionization of the neutral fuel gas present in or admitted into said ionization chamber. The secondary electrons released in the course of ionization are accelerated in the opposite direction in the electrical field provided for accelerating the positive ions and themselves act again in an ionizing manner. Following initiation of the ionization process by the electron beam, the secondary electrons may assume the main part of the further ionization.

A further important effect of the admitted electron beam is that focusing of a beam of ions accelerated in the electric acceleration field is favored by compensating its positive space charge with the electron beam, so that no screening of the accelerating electric field takes place. The acceleration field for the positive ions has a decelerating effect on the electrons of the electron beam running in the same direction as the accelerated ion current, so that the space charging density of the electron beam increases in the direction of the longitudinal axis of the ionization chamber, which advantageously corresponds with the concentration of the ion beam desired in the end section of the ionization chamber. The average speed of the electrons of the electron beam and the potential gradient of the acceleration field for the ions, which corresponds with a potential increase for the electrons, are preferably coordinated with each other in such a way that at the end of the acceleration path for the ions (or decelerating path for the electrons of the electron beam), the average speeds of the electrons of the electron beam and of the ions of the accelerated ion current are approximately the same, so that an approximately neutral plasma exits at the end of the acceleration path. The average speeds differ preferably by less than the factor 10.

The electron beam acts through its negative space charge over the entire length of the ionization chamber also as a central means for attracting the positive ions and supports focusing of the accelerated ions in a focused electron current and at the same time compensates mutual repelling of the ions. A widening of the electron beam can be counteracted by a beam guiding and/or beam focusing system consisting of magnetic and/or electric fields. Advantageous is especially a magnetic beam guiding system with a field extending within the zone of the beam substantially parallel with the direction of the beam and in relation to the longitudinal axis of the ionization chamber. Electrons of the electron beam with a component of the motion acting perpendicular to the longitudinal axis are forced by the magnetic field into a spiral orbit around the axis of the beam. Magnetic beam guiding systems are known per se from electron-beam tubes in a great variety of forms and in particular in conjunction with travelling-wave valves in the form of permanently periodic magnet arrangements with field direction reversals occurring along the central axis, where the field has strong radial components as well. Reference is made to such known beam-guiding systems for the purpose of disclosure. Traveling-wave valves with such magnet arrangements are known, for example from DE 2,652,020 B2 or DE-AS-1, 491,516.

A magnetic field system is also advantageously suitable for forcing the slow secondary electrons from the ionization processes that are accelerated in the electrical acceleration field for the positive ions in the opposite direction, into spiral-shaped or similarly curved orbits. In this way, the electrons are prevented from rapidly impacting an electrode following against the longitudinal axis of the ionization chamber, on the one hand, and the probability that a secondary electron triggers one or several further ionization processes is distinctly increased, so that the fuel gas can be primarily ionized by the secondary electrons. On the other hand, the positive space charging of the slow ions caused in the ionization process by the longer dwelling time of the secondary electrons is partially compensated. Finally, the electrons also can be largely kept within the respective potential stage by the magnetic field and finally can be guided to the electrode that is next against the longitudinal direction, so that higher losses of energy caused by secondary electrons that are accelerated over longer distances can be avoided. Reversing of the secondary electrons into curved orbits about the direction of the field acting on the electrons in an accelerating manner is particularly effective if the field directions of the electric and the magnetic fields are extending vertically one on top of the other. The electric fields and the magnetic fields are therefore advantageously realized in such a way that the field lines cross each other in the predominating part of the ionization chamber, in particular in more than 90% of its volume. The angle enclosed by the electric field direction and the magnetic field direction preferably amounts to between 45° and 135° in at least 50% of the volume of the ionization chamber. Both the magnetic and the electric field show in this connection in a distinct to predominant manner field components extending parallel with the longitudinal axis, and the mean field directions of the electric field and the magnetic field are preferably coinciding on the longitudinal axis of the ionization chamber. In connection with a magnetic field with field direction changes along the longitudinal axis, the mean field direction is to be understood without taking into account the polarity.

An advantageous arrangement for the present purposes provides for a field configuration in which electrodes for generating the electric field and poles of the magnetic field successively follow each other in the direction of the longitudinal axis in an alternating manner, and in which preferably electrodes and/or pole shoes are arranged on the side wall of the ionization chamber. The fields are preferably rotation-symmetric with respect to the longitudinal axis and show maximum and minimum values of their field strength on the longitudinal axis. In the simplest single-stage structure, two electrodes are arranged spaced from each other in the longitudinal direction of the ionization chamber, and three pole shoes surrounding the ionization chamber are also arranged spaced from each other in the longitudinal direction, and arranged with changing polarity in such a way that one of the two electrodes is enclosed in each case between two pole shoes. In the longitudinal direction, the electrodes each are at least approximately disposed near maximums of the magnetic field strength on the longitudinal axis, and the minimum of the magnetic field strength on the longitudinal axis in the site of the field direction reversal coincides at least approximately with the maximum of the electric field in the direction of the longitudinal axis.

Particularly advantageous is a multi-stage arrangement in which the magnetic field has a plurality of field direction reversals on the longitudinal axis and the pole shoes surrounding the ionization chamber in the form of a ring successively follow each other with alternating polarity in the longitudinal direction and each are inserted between two electrodes of the electric electron arrangement. The plurality of electrodes form potential stages. However, as opposed to the magnetic field, the electrical field shows no field direction reversal on the longitudinal axis. The electrical potential changes monotonously from stage to stage in the longitudinal direction of the ionization chamber. Outside of the longitudinal axis, the fields of the two types of field extend crossed in relation to each other, whereby the angle of between 45° and 135° enclosed by the field directions crossing each other is preferably disposed in at least 60% of the volume.

The electric and the magnetic fields can be advantageously coordinated with one another in a way such that a secondary electron produced by ionization within the zone of an electric potential stage between two electrodes directly neighboring on each other is kept by the magnetic field with said stage, if possible, and possibly guided to the electrode that is located next against the longitudinal direction upon effecting one or several further ionization processes.

While the electrons are subjected to strong influence of the magnetic field because of their low mass, the movement of the ions is substantially determined only by the electric fields. The ions are accelerated in the direction of the potential gradient and concentrated toward the longitudinal axis, whereby such focusing is decisively jointly effected also by the field lines occurring between adjacent electrodes. The ions are therefore capable of absorbing on the average from the electric field energy from a plurality of potential stages, whereas the energy losses caused by the secondary electrons trapped by the electrodes remain low, on the other hand, because their movement is limited to one or two potential stages, so that the result is a high degree of efficiency in the conversion of electric energy into mechanical energy.

The preferably ring-shaped electrodes, in particular the intermediate electrodes of a multi-stage arrangement enclosed between two further electrodes, have a flat expanse advantageously in the longitudinal direction for reliably catching secondary electrons, whereby the length of the intermediate electrodes in the direction of the longitudinal axis preferably amounts to at least 30%, in particular to at least 80% of the spacing from the next electrode in each case.

For obtaining the described field properties with limitation of the movement of the secondary electrons and focusing of the positive ions by field lenses, the diameter of an intermediate electrode preferably amounts to less than 300%, in particular less than 100% of the electrode length in the direction of the longitudinal axis.

The generation of a focused electron beam in the form of a central beam or a hollow beam is known in many variations from the technology of the cathode-ray tube, so that details in this regard are omitted here and reference is made to arrangements known from the prior art for example DE 1,222,589 B or DE 2,931,746 C2. For the present invention, an electron current detached from a cathode is focused to form a laminar beam, for example by means of an electron optical system of the Pierce type, and admitted into the ionization chamber along the longitudinal axis. The inlet zone of the electron beam, where the latter enters the ionization chambers, is advantageously realized in the form of a barrier for ions generated in the ionization chamber in order to prevent ions from being guided by penetration of the cathode potential to the cathode and causing losses or a degradation of the electron emission power of the cathode, or in order to keep such an undesirable ion current at least low. The first electrode, for example, can be realized as an ion barrier in the form of an annular shutter having a small diameter of the perforated shutter vis-a-vis the diameter of the ionization chamber. Within the ionization chamber, the beam is guided by the described magnetic field in the form of a focused beam.

The primary electrons of the focused electron beam are decelerated with the potential difference developed for the acceleration of the ions within the acceleration path between the first and the last electrodes of the preferably multi-stage electrode arrangement, which is preferably substantially identical with the ionization chamber. The electrons reach the end of the deceleration path without additional loss of energy with a residual speed that is to be much lower than the speed at the start of the deceleration path (deceleration path for the electrons). The voltage of the last electrode is for that purpose advantageously slightly positive versus the cathode. Without fuel gas in the ionization chamber, the electrons can be trapped at the end of the acceleration path with low residual energy by the last electrode then acting as the collector.

In the real case, with fuel gas in the ionization chamber, some of the primary electrons give off energy on their way through the ionization chamber due to interaction with the fuel gas, in particular due to excitation and ionization of fuel gas, and loose speed. The loss of speed based thereon, however, is very minor as compared to the initial speed and can be taken into account and particularly determined empirically when the potential of the last electrode is adjusted for obtaining a neutral plasma in the exiting beam of plasma.

The feed of the fuel gas preferably takes place through lateral wall openings of the ionization chamber in an zone that is spaced both from the inlet side of the electron beam and the outlet side of the plasma beam. The feed zone is preferably removed from the inlet of the electron beam with a spacing amounting to between 10% and 40% of the length of the ionization chamber in the longitudinal direction.

The features specified above and in the claims can be advantageously realized both individually and in combinations.

The invention is explained in detail in the following with the help of exemplified embodiments and by reference to the drawings, in which.

Figure 1:
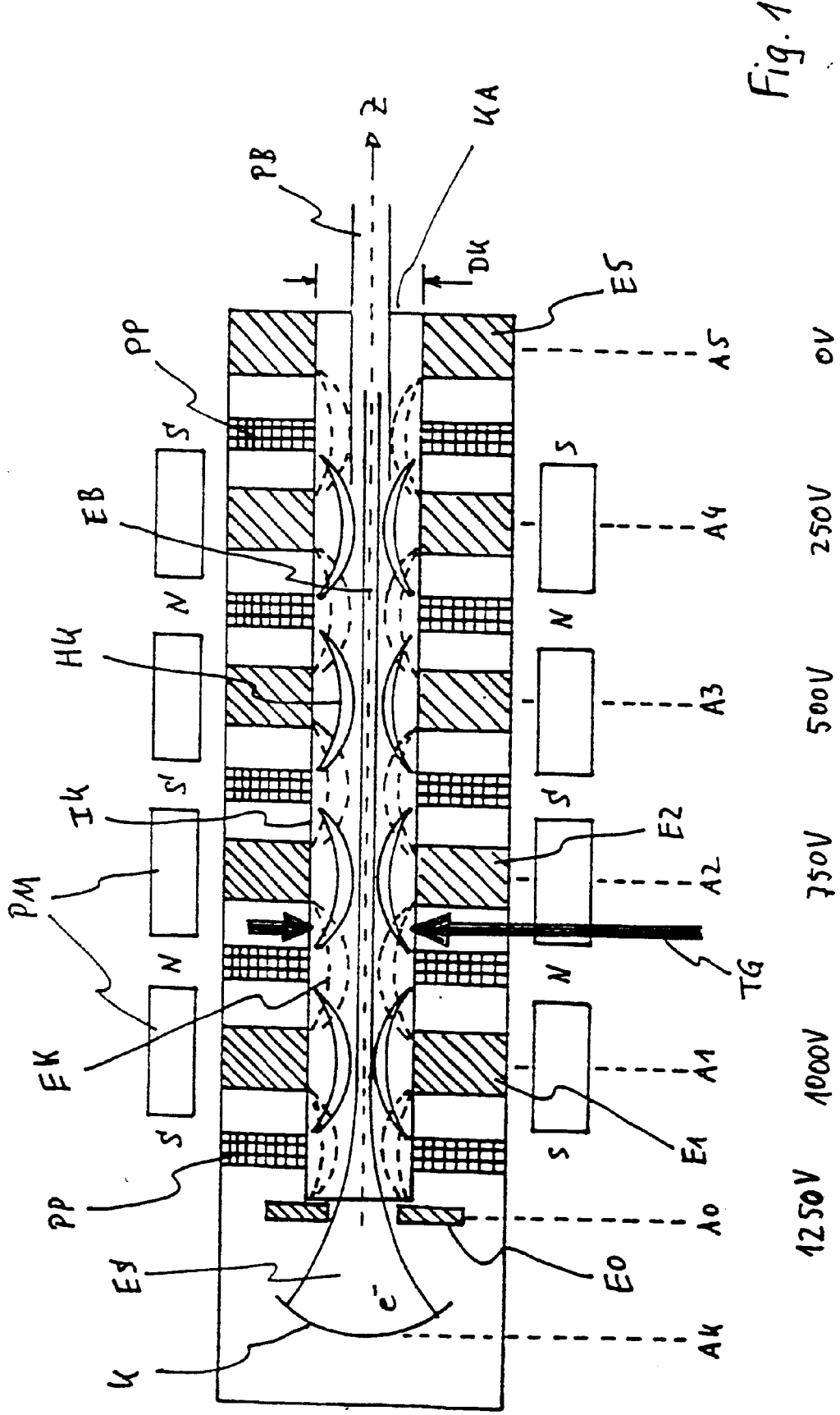
FIG. 1 is a longitudinal section through a multi-stage structure.

The arrangement sketched in FIG. 1 as a longitudinal section along a longitudinal axis "Z" has an ionization chamber "IK" around the longitudinal axis "Z". Said ionization chamber is structured, for example rotation-symmetrically around the longitudinal axis "Z". The longitudinal expanse of the ionization chamber "IK" in the direction of the longitudinal axis "Z" is assumed to be substantially greater than the diameter "DK" of the ionization chamber perpendicular to the longitudinal axis "Z". The ionization chamber "IK" is assumed to be defined transversely in relation to the longitudinal axis by a cylindrical side wall.

The magnetic pole shoes "PP" and the electrodes E1, E2 to E5 are arranged along the side wall, whereby the pole shoes and the electrodes are realized in a rotation-symmetrical manner at least on their sides pointing at the longitudinal axis "Z". The magnetic pole shoes "PP" deflect the magnetic flux generated by the permanent magnet "PM", the latter being arranged radially spaced from the ionization chamber "IK" in the radial direction, so that each pole shoe "PP" is forming a magnetic pole, whereby the pole shoes successively arranged one directly after the other in the longitudinal direction, are forming magnetic poles with the opposite polarity. The magnetic field developing in the ionization chamber "IK" between the pole shoes, therefore, shows a reversal of the field direction in the location of each pole shoe "PP". Such an arrangement of the magnetic field is sufficiently known per se from the technology of the travelling-wave valves as a permanently periodic magnetic system.

The electrodes E1 to E5 located between the pole shoes "PP" are acted upon by the different potentials A1, A2 to A5. The electrode arrangement is supplemented by a cathode "K" and an anode "E0". The cathode "K" and the anode "E0" form a beam generation system for generating a focused electron beam "EB" from a laminar electrode current "ES". Beam systems for generating and focusing an electron beam are known in a great number of variations from the prior art as well. The anode electrode E0 and the electrodes E1 to En defining the ionization chamber laterally jointly form an electrode arrangement with a potential gradient that is monotonous for ions, ranging from the potential E0 up to the potential A5 of the electrode E5, with $A0>A1>A2>A3>A4>A5$ for positively charged ions. For the negatively charged ions of the electron beam "EB", the potential series A0 to A5 forms a braking potential which is constantly reducing the starting speed of the electrons of the electron beam "EB" as it progresses along the longitudinal axis "Z". The voltage of cathode K is selected slightly negative as opposed to the last electrode E5, so that the electrons of the electron beam "EB" still have a low residual speed after passing through the ionization chamber up to the electrode E5. The electron beam "EB" is guided in the ionization chamber as a focused beam by the magnetic field "HK" built up between the pole shoes.

The neutral fuel gas "TG" is fed into the ionization chamber through the side wall. The electrons of the electron beam "EB" interact with the neutral fuel gas and effect a partial ionization of the gas. The positively charged ions generated by such interaction are accelerated in the direction of the potential gradient from A0 to A5 and are focused on their way toward the longitudinal axis "Z" by the focused electron beam "EB" and by the field lenses formed by the successively arranged electrodes. The secondary ions liberated in the ionization process have a very low speed at the start in the statistically varying direction. The secondary electrons are accelerated in the electrical field "EK" between the individual electrodes, whereby the direction of acceleration is opposing the direction of acceleration of the ions. The accelerated secondary electrons are reversed by the magnetic field "HK" that is present in the ionization chamber "IKL" at the same time, and are forced into curved orbits around the direction of the accelerating electrical field. The dwelling duration of the electrons in a stage between two electrodes is substantially prolonged in this way and the probability that such a secondary electron might trigger further ionization process is highly increased. The secondary electrons are finally trapped by an electrode following in the direction of the anode "E0". The longer dwelling time of the electrons in the ionization chamber between two electrodes until impacting an electrode also contributes to the fact that rapid build-up of a positive space charge by the positively charged ions and thus screening of the field accelerating the ions are avoided.

The ionization of the fuel gas "TG" by both the primary electrons of the electron beam EB and the secondary electrons from preceding ionization processes substantially distributes itself over the entire length of the ionization chamber. The ions accelerated along the potential gradient between A0 and A5 in the direction of the longitudinal axis "Z", and focused around the longitudinal axis "Z", together with the decelerated electrons of the focused electron beam "EB", jointly form at the outlet "KA" of the ionization chamber a largely neutral plasma beam "PB" with only minor beam divergence.

The anode electrode E0 is realized at the same time as an electron barrier and has the form of a shutter electrode with a small diameter of the shutter opening as compared to the diameter "DK" of the ionization chamber. In FIG. 1, the voltage of the electrodes E0 to E4 are plotted based on the last electrode E5 as exemplary values for the potential stages. The voltage of the cathode K is slightly negative versus the last electrode E5. The poles of the magnetic arrangement are distinguished by the designations "S" and "N" in the usual manner.

Figure 2:
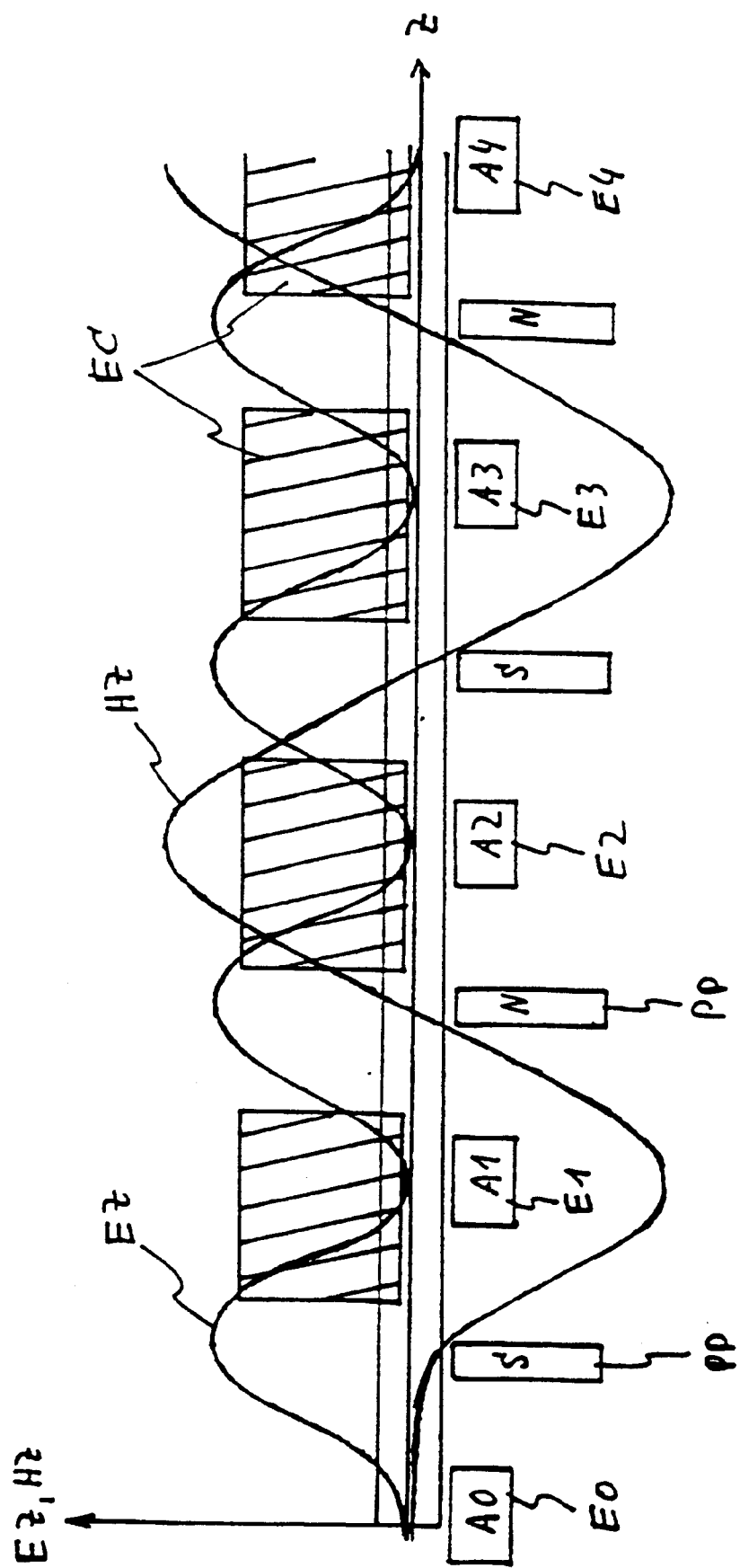
FIG. 2 shows the field curves for a multi-stage arrangement.

FIG. 2 qualitatively shows the field curve and the distribution of the electron charge along the longitudinal axis "Z" for a cutout from the structure according to FIG. 1. In the representation of FIG. 2, also the electrodes E0, E1 etc., as well as the pole shoes "PP" are indicated in their positions along the Z-axis in addition to the field curves and the charge distributions of the electrons. The primary electron beam "EB" is symmetrically plotted on both sides of the longitudinal axis "Z", whereas the accumulations "EC" of the secondary electrons are plotted only on one side of the longitudinal axis "Z" for the sake of better clarity. The field strengths are plotted on the longitudinal axis or within its immediate proximity with "Ez" and "Hz". The longitudinal axis "Z" forms the abscissa of the representation and the ordinate indicates the field intensities "Ez" and "Hz" qualitatively. The electric field "Ez" on the longitudinal axis is minimal in the positions of the electrodes E0, E1 etc., and maximal in the center between the electrodes. No reversal takes place in this connection in direction, so that the electric field strength does not change the sign in the present representation. The magnetic field strength in the Z-direction shows minimums in the locations of the pole shoes "PP", and maximums between two adjacent pole shoes. As opposed to the electric field, a reversal of the field direction occurs for the magnetic field on each of the individual pole shoes, which, in the sketch, represents a passage through the longitudinal axis "Z" imagined as the zero line, and which can be treated as a change in sign. The secondary ions generated in ionization processes are accelerated by the electric field in the ionization chamber and forced into curved orbits by the magnetic field. An accumulation of electrons, i.e. an increased concentration of electrons occurs in the ring-shaped zones "EC" around the longitudinal axis "Z"; said zones are approximately located at the minimums of the electric or maximums of the magnetic field with respect to the longitudinal direction.

Figure 3:
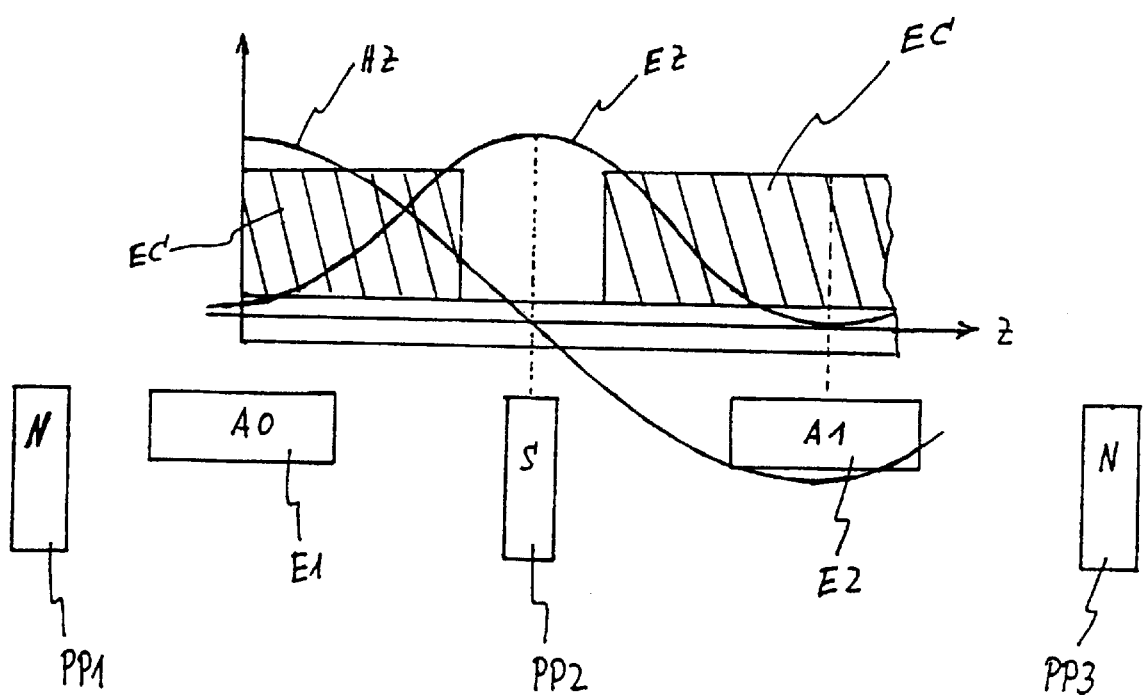
FIG. 3 shows the field curves for a single-stage arrangement.

FIG. 3 shows in a comparative representation as in FIG. 2 field curves and electron distributions for a single-stage arrangement with the two electrodes E1, E2 acted upon by the potentials A0 and, respectively, A1, as well as with a magnetic arrangement with the three pole shoes PP1, PP2 and PP3, of which two pole shoes enclose in each case one of the two electrodes E1 and E2, respectively. The field arrangement of such a single stage shows, in a way similar to the distribution sketched in FIG. 2, minimums of the electric field strength on the axis in the locations of the electrodes E1, E2, as well as a maximum of the electric field strength "Ez" on the axis between the two electrodes. The magnetic field strength "Hz" on the longitudinal axis "Z" reaches a minimum in the zone of the center pole shoe PP2, where a reversal of the field direction takes place as well. Maximums of the magnetic field strength are located again in the zone of the electrodes E1 and E2, where the electric field strength "Ez" has minimums on the axis. The mode of operation in the occurrence of the ring-shaped electron clouds "EC" around the longitudinal axis "Z" corresponds with what has been stated above with respect to FIG. 2.

The invention is not limited to the exemplified embodiments described above, but can be modified in a number of ways within the scope of the skills of the expert. Especially in regard to the dimensions of the ionization chamber and the ratios between the electrodes, the electrode spacing and the diameters of the electrodes in terms of size, a multitude of variations are conceivable that are adapted to the individual case. The spacings of the electrodes and/or of the pole shoes, as well as the length of the electrodes in the direction of the longitudinal axis are not necessarily constant for all stages in multi-stage arrangements. The potential gradient between the first and the last electrodes is not necessarily linear, but may assume also a nonlinear course in the individual case. The plasma accelerator arrangement is not limited to the described preferred case of application for an ion thruster for a spacecraft, but rather can be advantageously employed also for contactless metal working operations with the application of high power densities in operations such as, for example welding, soldering, cutting or the like, including also the working of high-melting metals.

What is claimed is:

1. A plasma accelerator arrangement, for generating a plasma beam, comprising:

a) an ionization chamber disposed around a longitudinal axis;

b) an electrode arrangement disposed in said ionization chamber and comprising a plurality of electrodes having different electric potentials for generating an electric potential gradient and an electrostatic field for the acceleration of positively charged ions wherein the electrostatic field extends along said longitudinal axis which defines an acceleration path;

c) an electron beam emitter coupled to said ionization chamber spaced apart from said plurality of electrodes in said electrode arrangement said electron beam emitter for emitting an electron beam along said longitudinal axis into said ionization chamber; and d) a magnetic beam guiding system which creates a magnetic field for guiding the electron beam along said longitudinal axis wherein said magnetic beam guiding system has at least one direction reversal of said magnetic field along said longitudinal axis and said acceleration path.

2. The arrangement as in claim 1, wherein said magnetic beam guiding system contains at least one permanent magnet.

3. The arrangement as in claim 1, wherein said plurality of electrodes in said electrode arrangement comprises at least one intermediate electrode.

4. The arrangement as in claim 3, wherein said ionization chamber has at least one lateral wall and said at least one intermediate electrode is disposed on said at least one lateral wall.

5. The arrangement as in claim 3, wherein each of said at least one intermediate electrode has a length that is at least 30% and at most 80% of a spacing from an adjacent electrode of said plurality of electrodes.

6. The arrangement as in claim 3, wherein said at least one intermediate electrode has a diameter that is less than 100% of its length along said longitudinal axis.

7. The arrangement as in claim 1, wherein said magnetic beam guiding system has a plurality of magnetic poles which are arranged in an alternating manner with each of said electrodes in said electrode arrangement being spaced apart in the direction of said longitudinal axis, wherein said plurality of magnetic poles arranged along said longitudinal axis create a plurality of direction reversals along said acceleration path.

8. The arrangement as in claim 1, wherein said electrostatic field and said magnetic field extend over more than 90% of the volume of the ionization chamber.

9. The arrangement as in claim 8, wherein said ionization chamber is designed so that across more than 60% of a volume of said ionization chamber, said electrostatic field direction and said magnetic field direction is between 45° and 135°.

10. The arrangement as in claim 1, wherein said plasma beam comprises a plurality of electrons having a mean speed approximately equal to a mean speed of said plurality of positively charged ions.

11. The arrangement as in claim 10, wherein said mean speed of said plurality of electrons differs from said mean speed of said plurality of positively charged ions by a factor of no more than 10.

12. The arrangement as in claim 1, further comprising an ion barrier disposed inside of said ionization chamber wherein said acceleration path for ions is sealed toward a side of entry of the electron beam by said ion barrier.

13. The arrangement as in claim 1, wherein at least one electrode of said plurality of electrodes is located at a start of said acceleration path for ions wherein said electrode is a shutter electrode having a central opening for the electron beam wherein said opening has a diameter that is substantially smaller than a diameter of the ionization chamber.

14. The arrangement as in claim 1, further comprising a neutral gaseous fuel feed for feeding fuel laterally into said ionization chamber.

15. The arrangement as in claim 14, wherein said fuel feed is disposed in a zone between 10% and 40% of a distance along a length of said chamber from a side entry of said electron beam.

16. The arrangement as in claim 1, wherein said ionization chamber has a length that is at least three times greater than its diameter.

17. The arrangement as in claim 1, wherein said acceleration path and said ionization chamber extend coaxially.

18. The arrangement as in claim 1, further comprising a cathode, disposed in said ionization chamber for generating a focused electron beam, and wherein said cathode has a voltage that is negative compared to a voltage of at least one of said plurality of electrodes, which is disposed at an outlet of said ionization chamber.

19. A plasma accelerator arrangement, for generating a plasma beam, comprising:
   a) an ionization chamber disposed around a longitudinal axis and having an outlet opening formed coaxially with said longitudinal axis and an acceleration path in said ionization chamber, said outlet opening allowing a plasma beam to leave said ionization chamber;
   b) an electrode arrangement disposed in said ionization chamber and comprising a plurality of electrodes having different electric potentials for generating an electric potential gradient and an electrostatic field for the acceleration of positively charged ions wherein the electrostatic field extends along said longitudinal axis which defines said acceleration path;
   c) an electron beam emitter coupled to said ionization chamber spaced apart from said plurality of electrodes in said electrode arrangement said electron beam emitter for emitting an electron beam along said longitudinal axis into said ionization chamber; and
   d) a magnetic beam guiding system which creates a magnetic field for guiding the electron bean along said longitudinal axis wherein said magnetic beam guiding system has at least one direction reversal of a magnetic field along said longitudinal axis and said acceleration path.

20. A plasma accelerator arrangement, for generating a plasma beam, the plasma accelerator in the form of an ion thruster or electric propulsion system comprising:
   a) an ionization chamber disposed around a longitudinal axis and having an outlet opening formed coaxially with said longitudinal axis and an acceleration path in said ionization chamber, said outlet opening allowing a plasma beam to leave said ionization chamber;
   b) an electrode arrangement disposed in said ionization chamber and comprising a plurality of electrodes having different electric potentials for generating an electric potential gradient and an electrostatic field for the acceleration of positively charged ions wherein the electrostatic field extends along said longitudinal axis which defines said acceleration path;
   c) an electron beam emitter coupled to said ionization chamber spaced apart from said plurality of electrodes in said electrode arrangement said electron beam emitter for emitting an electron beam along said longitudinal axis into said ionization chamber; and
   d) a magnetic beam guiding system which creates a magnetic field for guiding the electron beam along said longitudinal axis wherein said magnetic beam guiding system has at least one direction reversal of a magnetic field along said longitudinal axis and said acceleration path.

* * * * *